Patented Aug. 28, 1951

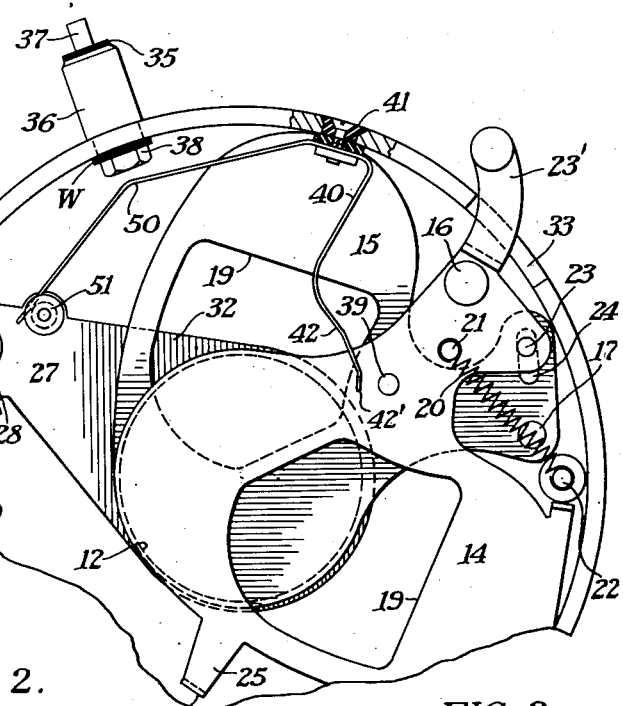

2,566,202

UNITED STATES PATENT OFFICE 2,566,202

SETTING TYPE SHUTTER HAVING BUILT-IN FLASH SYNCHRONIZING SWITCH AND SAFETY SWITCH

Howard T. Hodges, Rochester, N. Y., assignor to Eastman Kodak Company, Rochester, N. Y., a corporation of New Jersey Application February 23, 1949, Serial No. 77,716

4 Claims. (Cl. 95—11.5)

1

The present invention relates to photography, and particularly to a built-in flash synchronizing arrangement for photographic shutters of the set type.

One object of the present invention is to provide a built-in flash synchronizer for set type photographic shutters which gives positive assurance against the lamp circuit being closed during the cocking operation of the shutter, so that the photographer can safely place a new lamp in the circuit without danger of it being accidentally fired during cocking of the shutter.

Another object is to provide a built-in flash synchronizing device which is simple and rugged in construction, while at the same time being efficient in operation.

Another object is to provide a built-in flash synchronizing device which is particularly adapted for use in combination with a certain type of shutter mechanism and can be combined therewith with no change in the normal operation of the shutter mechanism and with a minimum of extra parts.

And, further objects are to provide a built-in flash mechanism which is so designed that the relative timing of the closing of the lamp circuit and the opening of the shutter blades necessary to synchronization can be readily accomplished during assembly; to provide a synchronizer which includes two switches in series and each of which is positively closed to insure good electrical contact; and to provide a flash switch so associated with the shutter mechanism that a firm wiping engagement of the switch contacts can be tolerated during the opening movement of the shutter blades without slowing down the shutter speed to any noticeable extent.

The novel features that I consider characteristic of my invention are set forth with particularity in the appended claims. The invention itself, however, both as to its organization and its methods of operation, together with additional objects and advantages thereof will best be understood from the following description when read in connection with the accompanying drawings, in which:

Fig. 1 is a partial plan view of a shutter with the cover removed and showing the shutter parts in a released position; and showing a preferred form of synchronizing mechanism built into the shutter;

2

Fig. 2 is a view similar to Fig. 1, but showing the shutter parts in a cocked condition and the trigger moved to a position just short of releasing the blade mechanism;

Fig. 3 is a partial sectional view taken substantially on line 3—3 of Fig. 2; and Fig. 4 is a section taken substantially on line 4—4 of Fig. 2 and showing the shape and cooperating relation of the latching member and latch for holding the shutter blades in a cocked condition.

Like reference characters refer to corresponding parts throughout the drawings.

Referring now to the drawings, I have chosen to show the built-in synchronizer constituting the present invention in combination with a photographic shutter comprising a metal casing 10 having an upstanding wall 11 and an exposure aperture indicated by the dotted circle 12 located in the center of the bottom wall 13 of the casing. The shutter blade mechanism comprises a pair of similarly shaped blades 14 and 15 pivoted to the bottom wall of the casing to move in overlapping relation across the exposure aperture 12 to make an exposure. Blade 14 is pivoted on a stud 16 and blade 15 is pivoted on a stud 17. Each blade is provided with a similarly shaped aperture 19 disposed so as to move across exposure aperture 12 when the blades swing in opposite directions about their respective pivots. When the blades are in either their extreme cocked or released positions, the exposure aperture 12 is covered by parts of each, and when the blades move across the aperture in opposite directions, the apertures in each of the blades come into alignment with each other and the exposure aperture to effect an exposure.

The blade 14 is normally moved in a counterclockwise direction about its pivot 16 by a driving spring 20 having one end fixed to a pin 21 on the shutter blade and having its other end fixed to a pin 22 on the bottom wall 13 of the casing. The two blades are operatively connected together by a pin and slot connection comprising a pin 23 on the blade 14 extending through a slot 24 in the blade 15. By virtue of this pin and slot connection, movement of blade 14 in one direction causes the blade 15 to swing about its pivot in the opposite direction in a scissor fashion and, as the result of which, the spring 20 acting on the blade 14 serves as the power source for driving both blades.

The shutter blades are cocked by depressing a cocking arm 23' integral with the blade 14 and extending through a slot 33' in the upstanding wall 11 of the casing 10 in a clockwise direction from the position shown in Fig. 1 to that shown in Fig. 2. The blades are held in a cocked condition by a turned-down end 24 on an arm 25 extending radially from blade 14, dropping down behind an upstanding latch member 26 on a trigger member 27 pivoted at 28 to the bottom wall of the casing. The trigger member 27 is normally moved clockwise about its pivot by a spring 29 to the position shown in Fig. 1, and the lower end of the turned-down end 24 of the arm 25 is cam shaped to allow it to cam over the latch member when the blades are cocked and to drop down behind the latch member to hold the blades in a cocked condition. A detail of these two parts and their intended cooperation is shown in Fig. 4.

The trigger member 27 includes a trigger arm 30 extending through a slot 31 in the upstanding wall 11 of the casing. By manually depressing this trigger arm 30 counterclockwise from the position shown in Fig. 1, the trigger member and, hence, the latch member 26 thereon, is moved counterclockwise to release the turned-down end 26 on the shutter blade 14, whereupon the spring 20 is free to drive the blades 14 and 15 to make an exposure. The latch member 26 is made arcuate in shape and of substantial length so that considerable movement of the trigger member is required in order to release the shutter. Such extended movement of the trigger member is required, since it includes a cover blind portion 32 which normally covers the exposure aperture 12 and must be removed to a position to uncover the exposure aperture before the blades are released and start to move from their cocked position. This cover blind 32 is required since the two apertures 19 in the blades 14 and 15 uncover the exposure aperture during a setting of the shutter blades and an accidental exposure would be made during the setting operation if the exposure aperture was not covered during this time.

Coming now to the flash synchronizing mechanism of the shutter, a male electrical jack 35 is fixed to the upstanding wall 11 of the casing and extends radially therefrom to receive a female connector associated with a flash holder, not shown, which will contain a flashlamp "L" and a suitable battery "B," each diagrammatically illustrated in Fig. 2. This electrical jack comprises a pair of terminals 36 and 37 in concentric relation and insulated from each other by a suitable sleeve of insulating material. The terminal 36 consists of a metal casing which is grounded to the metal shutter casing while terminal 37 extends through the wall 11 of the shutter casing and receives a nut 38 which serves to attach the jack to the shutter casing wall. This nut, as well as that portion of the terminal 37 extending through the shutter casing, is insulated from the shutter casing by a fiber bushing "W" and constitutes a fixed contact of one switch of the synchronizer mechanism, as will be hereinafter described.

The timing switch of the synchronizer mechanism comprises an upstanding metal pin 39 which is staked to the shutter blade 14 and a resilient conductor 40 fixed to and insulated from the upstanding wall 11 of the casing by an insulated bushing and bolt combination 41. The end 42 of the conductor 40 is bent to normally lie in the path of movement of the pin 39 so as to be wiped thereby as the shutter blade 14 moves between its two positions and thereby close the flash circuit. When the shutter blades are in their cocked position, see Fig. 2, the contact pin 39 is spaced from the bent end 42 of the conductor 40 so that the switch is open. These two contacts are so disposed that they will come into engagement prior to the blades reaching their full-open position by an interval equal to that of the "lag" characteristic of the flashlamp to be used. This mechanism is adapted for use with only one particular type of flashlamp because no adjusting means for the contacts to alter their instant of engagement during the opening of the blades is provided. Accordingly, if a flashlamp having a 5 millisecond lag is to be used, the contacts will be so disposed that pin 39 will come into wiping engagement with the end 42 of conductor 40 five milliseconds before blade 14 reaches a position where its aperture 19, in combination with aperture 19 in blade 15, completely uncovers the exposure aperture. The extreme end 42' of conductor 40 is turned outwardly away from the path of movement of the pin 39 so that the pin can cam the contact 42 out of the way during the setting operation of the shutter blades. In Fig. 2, the dotted positions of the pin 39 and contact portion 42 of conductor 40 show the positions which these two parts take as the blade 14 moves from a cocked to a released position.

The use of wiping contact switches of this nature have been used before in flash synchronizers built into shutters because of the fact that they directly associate the switch with the shutter mechanism and simplify the timing problem. They have always presented the problem, however, that the frictional contact between the pin associated with the shutter mechanism and the resilient contact introduce a retard action on the shutter blade movement which appreciably slows down the shutter speed and, hence, the exposure time. In the past, it has been necessary to either tolerate this slowing up of the shutter, or to reduce the wiping contact between the pin and resilient contact to a point where the engagement between the two contacts was reduced to such a short duration or such a light pressure that electrical conductivity was not always assured and the switch failed to close a circuit. These difficulties are overcome in the present arrangement because of the disposition of the switch contacts permitted by this particular arrangement of parts. It will be noticed that contact pin 39 is disposed substantially close to the pivot point of the blade 14, the degree of separation depending upon the amount of movement of the pin that is required to allow the same to move out of engagement with contact 42 at both positions of the shutter blade. This means that the moment arm, through which the frictional retard force occasioned by this wiping engagement of contacts, acts on the blade movement is a minimum and much less than that found in previously available synchronizer systems of this type. Because this moment arm is small and consequently the retard force on the shutter is small, the spring 20 is found to possess sufficient power to permit a rather long and forceful contact between pin 39 and contact 42 without suffering any slowing up difficulties. This fact assures a good electrical contact between the switch members.

Inasmuch as pin 39 wipes contact 42 during the setting operation of the shutter and thus closes the flash circuit, unless some means are provided to prevent the circuit from being closed, a lamp, if placed in the circuit before the shutter is set, would be accidentally fired during the setting operation. To overcome this difficulty I have provided a second switch in the lamp circuit in series with the described timing switch and which switch is normally open at all times except when the blades are moving from their cocked position to their released position.

To this end I provide a second switch, one contact of which is fixed and comprises the nut 38 which is insulated from the shutter casing and adapted to be connected to the side of the lamp circuit opposite to that to which the pin 39 is connected. The other contact of this second switch is a portion 50 of resilient conductor 40 and which, by virtue of the inherent resilience of the material from which it is made, is normally moved away from fixed contact 38.

Accordingly, contact 42 of the first switch is normally dead and although the first switch closes during the setting operation of the shutter, it cannot complete the lamp circuit. The extreme end of contact 50 is bent downwardly to engage a spool-shaped post 51 fixed to the trigger member 27, said post being made of a suitable insulating material to prevent short-circuit difficulties. When the trigger is depressed to release the shutter, the post 51 moves contact 50 into engagement with fixed contact 38 just before the shutter blades are released, see Fig. 2. Accordingly, the lamp circuit is then in such a condition that the timing switch comprising contacts 39 and 42 will control the flashing of the lamp. Inasmuch as the blades operate so fast after release, it will be impossible to release the trigger so that the contact 50 will move away from contact 38 before the pin 39 wipes contact 42 and thus have the flash system fail. On the other hand, since the trigger is released after the exposure is made, and the movable contact 50 is allowed to move away from contact 38 and open the circuit at this point, closing of the timing switch during the setting of the shutter cannot complete the lamp circuit.

Inasmuch as the second switch is positively closed by operation of the trigger, it is possible to obtain a firm engagement between contacts 50 and 38 to insure good electrical conductivity. In order to guide the contact 50 laterally and insure its being held out of contact with the shutter blades, which, by the way, would short the circuit, the post 50 is provided with flanges, see Fig. 3, which are adapted to engage the edges of the contact 50 and confine it against lateral movement, despite a relative sliding engagement between the contact and post occasioned by the arcuate movement of the post relative to the contact. Another important reason for holding the contact 50 against lateral movement toward the blades is that blade 14 in moving to its cocked position is lifted slightly by virtue of the turned-down end 27 carried thereby being cammed over the latch member 26. This lifting of the shutter blade 14 thus occurs at just the time blade 14 lies under contact 50 so that contact must be definitely spaced from the blade by a distance greater than this lifting movement in order to prevent a shorting of the circuit at this time.

From the above description it will be apparent that the present synchronizer mechanism is readily adapted for combination with a shutter mechanism of the type disclosed in order to provide a simple rugged and foolproof device. The synchronizing mechanism includes a minimum number of additional parts and its combination with the shutter mechanism is readily accomplished without altering in any way the normal operation of the shutter.

While in the particular modification disclosed the trigger and latch for the shutter blade mechanism are part of a common member, it will be readily appreciated that these two parts could be separately mounted so that movement of the trigger would operate the latch member; each having their own spring, such as is a well-known procedure in the shutter art.

Although I have shown and described certain specific embodiments of my invention, I am aware that many modifications thereof are possible. This invention, therefore, is not to be restricted except insofar as is necessitated by the prior art and by the spirit of the appended claims.

Having thus described my invention, what I claim as new and desire to secure by Letters Patent of the United States is:

1. In a flashlight synchronizing device the combination with a photographic shutter of the set type including a casing, a pair of pivoted shutter blades in said casing movable relative to one another from a cocked position to a released position to make an exposure, a spring acting on said blades to normally move them toward their released position, means for cocking said blades, a latch for releasably holding said blades in their cocked position and a trigger for moving said latch to release said blades, of a flashlight synchronizer mechanism comprising a lamp circuit including a pair of switches connected in series relation at all times, one of said switches comprising a pin fixed to one of said blades to move therewith and a resilient contact disposed in the path of movement of said pin to be wiped thereby during movement of the blade between its two positions, and the second switch comprising a fixed contact and a movable contact normally moved away from the fixed contact, and a direct operative connection between said movable contact and the trigger for moving the same into engagement with said fixed contact when the trigger is moved to release said latch and at an instant prior to release of said latch by the trigger.

2. A flashlight synchronizing device according to claim 1, in which the trigger and latch comprise a common member, and the operative connection between the movable contact and the trigger comprises a stud on said common member against which the end of said movable contact normally rests.

3. A flashlight synchronizing device according to claim 1, in which the flashlamp circuit includes a pair of terminals extending from said casing and to which a circuit including a lamp and source of potential is adapted to be connected, one of said terminals grounded to the shutter casing and the other terminal insulated from said casing and constituting said fixed contact of the second switch, and said resilient contact of said first switch and said movable contact of said second switch comprising a common conductor fastened to and insulated from said casing at a point intermediate its two ends.

4. A flashlight synchronizing device according to claim 1, in which the operative connection between the movable contact and the trigger comprises a stud of insulating material moved over a given path as the trigger moves, the end of said movable contact being normally held against said stud to be moved thereby into engagement with said fixed contact, said stud including flanges at both ends to guide the movable contact laterally and prevent it from accidentally contacting any adjacent parts of the shutter mechanism and shorting the lamp circuit.

HOWARD T. HODGES.

REFERENCES CITED

The following references are of record in the file of this patent:

UNITED STATES PATENTS

| Number | Name | Date |
|---|---|---|
| 2,198,975 | Pollock | Apr. 20, 1940 |
| 2,256,354 | Riddell | Sept. 16, 1941 |
| 2,277,233 | Kende et al. | Mar. 24, 1942 |
| 2,284,486 | Hineline | May 26, 1942 |
| 2,291,190 | Schwartz et al. | July 28, 1942 |
| 2,358,941 | Schwarz | Sept. 26, 1944 |

FOREIGN PATENTS

| Number | Country | Date |
|---|---|---|
| 440,638 | Great Britain | Jan. 3, 1936 |